(12) United States Patent
Drabon et al.

(10) Patent No.: US 10,414,230 B2
(45) Date of Patent: Sep. 17, 2019

(54) FASTENING SHACKLE FOR FASTENING A LEAF SPRING TO A VEHICLE BODY

(71) Applicants: Benteler Automobiltechnik GmbH, Paderborn (DE); Benteler SGL GmbH & Co. KG, Paderborn (DE)

(72) Inventors: Rodscha Drabon, Salzkotten (DE); Torsten Howe, Lage (DE); Dirk Rochell, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 15/288,086

(22) Filed: Oct. 7, 2016

(65) Prior Publication Data

US 2017/0100977 A1   Apr. 13, 2017

(30) Foreign Application Priority Data

Oct. 12, 2015  (DE) .......................... 10 2015 117 349

(51) Int. Cl.
*B60G 11/10* (2006.01)
*B60G 11/12* (2006.01)
(Continued)

(52) U.S. Cl.
CPC .............. *B60G 11/10* (2013.01); *B60G 11/04* (2013.01); *B60G 11/12* (2013.01); *F16C 11/04* (2013.01); *F16C 33/201* (2013.01); *F16C 33/208* (2013.01); *F16C 33/22* (2013.01); *F16F 1/28* (2013.01); *F16F 1/30* (2013.01); *F16F 1/3686* (2013.01); *F16F 1/3849* (2013.01); *B60G 2200/31* (2013.01); *B60G 2202/112* (2013.01); *B60G 2204/121* (2013.01); *B60G 2204/418* (2013.01); *B60G 2204/422* (2013.01);
(Continued)

(58) Field of Classification Search
CPC .. B60G 11/10; B60G 11/12; B60G 2204/121; F16F 1/3849; F16F 1/28; F16F 1/3686; F16F 1/30; F16F 1/26
USPC ................................ 267/270, 271, 292, 293
See application file for complete search history.

(56) References Cited

U.S. PATENT DOCUMENTS

| 1,376,803 A | * | 5/1921 | Fekete | ................... B60G 11/12 267/271 |
| 1,452,693 A | * | 4/1923 | Lord | ..................... B60G 11/12 267/270 |

(Continued)

FOREIGN PATENT DOCUMENTS

| DE | 196 23 612 A1 | 12/1996 |
| EP | 1 600 658 B1 | 4/2005 |

(Continued)

*Primary Examiner* — Thomas J Williams
*Assistant Examiner* — James K Hsiao
(74) *Attorney, Agent, or Firm* — Holland & Hart LLP (57) ABSTRACT

A fastening shackle for fastening a leaf spring to a vehicle body of a vehicle includes: a first bearing end which can be fastened to the vehicle body, a second bearing end, and a shackle body connecting the first bearing end and the second bearing end. The first bearing end has an outer sleeve, an inner sleeve and a sleeve-shaped plastic plain bearing, the sleeve-shaped plastic plain bearing being arranged in the outer sleeve and being slidably mounted in the outer sleeve, and the inner sleeve being affixed to the sleeve-shaped plastic plain bearing. The leaf spring is mountable at the second bearing end.

17 Claims, 6 Drawing Sheets

(51) Int. Cl.
*F16F 1/30* (2006.01)
*F16F 1/36* (2006.01)
*F16F 1/368* (2006.01)
*F16F 1/38* (2006.01)
*F16C 33/20* (2006.01)
*B60G 11/04* (2006.01)
*F16F 1/28* (2006.01)
*F16C 11/04* (2006.01)
*F16C 33/22* (2006.01)

(52) U.S. Cl.
CPC .............. *B60G 2206/7101* (2013.01); *B60G 2206/81012* (2013.01); *F16C 2208/04* (2013.01); *F16C 2208/82* (2013.01); *F16F 2230/0005* (2013.01)

(56) References Cited

U.S. PATENT DOCUMENTS

| | | | |
|---|---|---|---|
| 1,835,575 A | 12/1931 | Sanders et al. | |
| 2,183,923 A * | 12/1939 | Roberts | B60G 11/12 267/268 |
| 2,240,894 A * | 5/1941 | Roberts | B60G 11/12 267/267 |
| 3,373,834 A * | 3/1968 | Rosenkrands | B60G 11/12 180/353 |
| 3,434,707 A * | 3/1969 | Raidel | B60G 7/02 267/270 |
| 3,921,965 A * | 11/1975 | Skerry | B60G 11/02 267/269 |
| 4,003,562 A * | 1/1977 | Kaiser | B60G 11/12 267/268 |
| 4,125,276 A * | 11/1978 | Levasseur | B60G 21/055 267/270 |
| 4,193,612 A * | 3/1980 | Masser | B60G 5/02 267/293 |
| 4,293,145 A * | 10/1981 | Taylor | B62D 61/125 267/34 |
| 4,420,171 A * | 12/1983 | Raidel | B60G 5/047 267/31 |
| 4,619,466 A * | 10/1986 | Schaible | B60G 11/08 267/273 |
| 4,638,936 A * | 1/1987 | Viehrig | G03D 3/13 226/191 |
| 4,767,108 A * | 8/1988 | Tanaka | B60G 7/00 267/140.12 |
| 4,840,395 A * | 6/1989 | Sturmon | B60G 7/001 280/86.75 |
| 4,981,308 A * | 1/1991 | Kunert | B60G 3/06 267/293 |
| 5,007,660 A * | 4/1991 | Orndorff, Jr. | B60G 11/42 267/25 |
| 5,286,014 A * | 2/1994 | Chakko | B60G 7/00 267/141.2 |
| 5,437,439 A * | 8/1995 | Brokamp | B60G 11/10 267/293 |
| 5,820,115 A * | 10/1998 | Stevenson | F16C 27/063 267/293 |
| 5,988,614 A * | 11/1999 | Sturmon | B60G 7/02 267/292 |
| 6,019,384 A * | 2/2000 | Finck | B60G 11/125 267/260 |
| 6,082,721 A * | 7/2000 | Kingsley | F16B 11/008 267/276 |
| 6,619,639 B1 * | 9/2003 | Shelley | B60G 7/008 267/292 |
| 7,219,883 B2 * | 5/2007 | Huprikar | B60G 7/02 267/141.4 |
| 7,264,252 B2 * | 9/2007 | Espriu | B60G 11/22 280/124.175 |
| 7,325,796 B2 * | 2/2008 | Moreland | F16F 1/3842 267/293 |
| 8,172,245 B2 * | 5/2012 | Gerrard | B60G 9/003 280/124.175 |
| 8,882,092 B2 * | 11/2014 | Jang | B60G 21/0551 267/141 |
| 9,290,221 B2 * | 3/2016 | Conaway | B60G 5/04 |
| 9,297,435 B2 * | 3/2016 | Cerri | F16F 7/108 |
| 2001/0013676 A1 * | 8/2001 | Reast | B60G 11/12 267/47 |
| 2003/0057622 A1 | 3/2003 | Bovio et al. | |
| 2003/0098565 A1 * | 5/2003 | Mosler | B60G 11/04 280/124.175 |
| 2006/0186590 A1 * | 8/2006 | McLaughlin | B60G 11/12 267/293 |
| 2007/0017512 A1 * | 1/2007 | Peter | A61M 5/14244 128/203.15 |
| 2007/0034465 A1 * | 2/2007 | Thompson | F16D 65/28 188/322.16 |
| 2007/0187920 A1 * | 8/2007 | Furman | B60G 9/003 280/124.175 |
| 2007/0290425 A1 * | 12/2007 | Heuer | F16F 1/3814 267/293 |
| 2009/0084911 A1 * | 4/2009 | Bergmann | B23D 47/02 248/157 |
| 2013/0140786 A1 * | 6/2013 | Enomoto | B60G 11/04 280/124.175 |
| 2014/0353936 A1 * | 12/2014 | Preijert | B60G 9/003 280/124.116 |
| 2015/0061255 A1 * | 3/2015 | Girelli Consolaro | B60G 11/107 280/124.171 |

FOREIGN PATENT DOCUMENTS

| | | |
|---|---|---|
| EP | 1 911 613 A1 | 4/2008 |
| JP | 61-157847 A | 7/1986 |
| KR | 1020050006753 A | 1/2005 |

* cited by examiner

FASTENING SHACKLE FOR FASTENING A LEAF SPRING TO A VEHICLE BODY

CROSS-REFERENCE TO RELATED APPLICATIONS

This application claims priority to German patent application No. 10 2015 1117 349.2, entitled "Befestigungsschákel zur Befestigung einer Blattfeder an einem Fahrzeugaufbau", and filed on Oct. 12, 2015 by the assignee of this application, the entire disclosure of which is incorporated by reference for all purposes.

BACKGROUND

The present disclosure relates to the fastening means of a leaf spring in a vehicle.

A leaf spring can be used for the sprung suspension of a wheel in a vehicle, which leaf spring extends in the driving direction or in the vehicle longitudinal direction. A leaf spring is usually produced from a fibre composite plastic and, at the respective leaf spring end, comprises an elastomeric bearing for fastening the leaf spring to a vehicle body, for example to a vehicle frame or to a chassis. In the central region, the leaf spring is usually connected via a central attachment to a rigid axle of the vehicle.

The leaf spring is often connected via a shackle to the vehicle body, in order to make longitudinal compensation possible. Here, the shackle is connected fixedly to the elastomeric bearing of the leaf spring. The elastomeric bearing of the leaf spring is provided, in order to at least partially absorb a Cardanic movement of the leaf spring ends or in order to at least partially absorb a torsional force of the leaf spring. Under the influence of a lateral force in the vehicle transverse direction, however, the leaf spring bends in the vehicle transverse direction, as a result of which the wheel which is coupled to the leaf spring can be shifted in the vehicle transverse direction. Bending of the leaf spring leads, in particular, to a lateral deformation of the elastomeric bearing of the leaf spring which influences the driving dynamics and is undesirable. In order to reduce the bending of the leaf spring in the vehicle transverse direction, the dimensions of the leaf spring can be increased, for example. This is associated, however, with an increased vehicle weight and with increased production costs.

SUMMARY

It is therefore the object of the present disclosure to provide a fastening concept for fastening a leaf spring to a vehicle body of a vehicle with improved driving dynamics.

This object is achieved by way of the features of the independent patent claims. Advantageous developments are the subject matter of the dependent claims, the description and the appended figures.

The present disclosure is based on the finding that the above object can be achieved by way of a fastening shackle which has a plain bearing, via which the fastening shackle can be fastened to a vehicle body. The plain bearing makes pivoting of the shackle on the vehicle body in the longitudinal direction of the leaf spring possible, as a result of which at least one component of the Cardanic movement of the leaf spring can be absorbed.

The fastening shackle can be used, for example, for fastening a leaf spring to a vehicle body, which leaf spring can have, furthermore, an elastomeric bearing or a rubber bearing, in order to absorb a torsional force of the leaf spring on account of a deformation of the elastomer in the elastomeric bearing. The plain bearing of the fastening shackle may have a higher Cardanic stiffness than the elastomeric bearing of the leaf spring, as a result of which the lateral stiffness of the resulting leaf spring system is increased. This leads to it being possible for a displacement of a wheel which is coupled to the leaf spring in the vehicle transverse direction to be reduced by up to from 15% to 20%. If the leaf spring is loaded with a lateral force, the fastening shackle, on account of its lateral stiffness, achieves a situation where the leaf spring can bend to a lesser extent in the central region. If the plain bearing has a lower rotational stiffness than the elastomeric bearing of the leaf spring, a considerable increase in the Cardanic stiffness can be achieved with a simultaneous reduction in the torsional strength. As a result, the driving dynamics of the vehicle can be improved with unchanged dimensions of the leaf spring.

According to a first aspect, the present disclosure relates to a fastening shackle for fastening a leaf spring to a vehicle body of a vehicle, having a first bearing end which can be fastened to the vehicle body, the first bearing end having an outer sleeve, an inner sleeve and a sleeve-shaped plastic plain bearing, the sleeve-shaped plastic plain bearing being arranged in the outer sleeve and being mounted slidably in the outer sleeve, and the inner sleeve being connected fixedly to the sleeve-shaped plastic plain bearing, a second bearing end, at which the leaf spring can be mounted; and at least one shackle body which connects the first bearing end and the second bearing end.

As a result of the fixed connection between an outer wall of the inner sleeve and an inner wall of the sleeve-shaped plastic bearing, both the plastic plain bearing and the inner sleeve are mounted rotatably in the interior of the outer sleeve. The fastening shackle may have a lateral stiffness which is higher than the lateral stiffness of the elastomeric bearing of the leaf spring.

In addition, the arrangement of the plastic plain bearing in the fastening shackle makes a more accurate and defined setting of a dynamic wheel track possible, in particular with consideration of the dynamics of the leaf spring during compression or rebound.

The sleeve-shaped plastic plain bearing may be mounted in the outer sleeve in such a way that its surface slides on an inner wall.

According to one example, the sleeve-shaped plastic plain bearing is formed by a single-piece plastic sleeve. The single-piece plastic sleeve can be realized, for example, by way of a plastic injection process, in which plastic is injected between the inner sleeve and the outer sleeve. As a result, the advantage of particular production efficiency is achieved.

According to one example, it is possible for an elastomeric bearing of the leaf spring to be mounted at the second bearing end, and a value of elasticity of the sleeve-shaped plastic plain bearing is lower than a value of elasticity of an elastomer of the elastomeric bearing. In other words, the sleeve-shaped plastic plain bearing is stiffer or less elastic than the elastomer which is used in the elastomeric bearing of the leaf spring.

According to one example, the sleeve-shaped plastic plain bearing is formed from plastic which comprises a tribological polymer. As a result of the use of the tribological polymer which is often also called a tribopolymer, the stiffness, hardness and wear resistance of the plastic plain bearing are increased.

According to one example, the sleeve-shaped plastic plain bearing is formed from a fibre composite material which comprises a polymer, in particular a tribological polymer, reinforcing fibres, in particular glass fibres, and optionally a solid lubricant. As a result of the use of the fibre composite material, the stiffness of the sleeve-shaped plastic plain bearing is increased. The embedded solid lubricant is discharged to the outside by the plastic plain bearing, as a result of which a friction between an outer surface of the sleeve-shaped plastic plain bearing and an inner wall of the outer sleeve is reduced. In addition, the sleeve-shaped plastic plain bearing can be realized inexpensively.

According to one example, the sleeve-shaped plastic plain bearing is connected in an integrally joined manner to the inner sleeve, in particular to an outer wall of the inner sleeve. The integrally joined connection can be realized advantageously by way of direct injection of the plastic onto the outer wall of the inner sleeve. In addition, a non-positive/positively locking attachment can be realized by way of knurling.

According to one example, furthermore, the fastening shackle has a bearing pin which penetrates the inner sleeve. The fastening shackle can be fastened to the vehicle body by way of the bearing pin. The bearing pin can be manufactured, for example, from metal, in particular from steel.

According to one example, the outer sleeve, in particular the outer wall of the outer sleeve, is connected fixedly to the shackle body or is formed in one piece with the shackle body, for example as a cast part.

According to one example, a leaf spring holder for securing the leaf spring is arranged at the second bearing end. The leaf spring can be pushed into the leaf spring holder on the end side and can be held therein on the end side. The leaf spring holder can be held at the second bearing end by means of an elastomeric bearing.

According to one example, the second bearing end comprises a bearing sleeve which can be penetrated by a bearing pin, or the shackle body having a first shackle web and a second shackle web at the second bearing end, the first shackle web and the second shackle web having in each case one passage which can be penetrated by a bearing pin.

According to one example, the first bearing end is rigid or displaceable in a transverse direction of the leaf spring, in particular is slightly laterally displaceable.

According to a second aspect, the present disclosure relates to a leaf spring arrangement having a leaf spring and the fastening shackle according to the invention, a leaf spring end being mounted rotatably at the second bearing end of the fastening shackle, and the first bearing end of the fastening shackle being fastened to a vehicle body.

By way of the mounting of the leaf spring of the fastening shackle, the advantage of more precise setting of a dynamic wheel track is additionally achieved.

According to one example, the first longitudinal leaf spring bearing and the second longitudinal leaf spring bearing are elastomeric bearings. The absorption of Cardanic forces is made possible by way of the elasticity of the elastomeric bearings.

According to one example, an outer wall of the inner sleeve is provided with knurling. As a result, the adhesion between the inner sleeve and the sleeve-shaped plastic plain bearing can be increased.

According to a third aspect, the present disclosure relates to a method for producing a fastening shackle for fastening a leaf spring to a vehicle body of a vehicle, comprising: providing a basic shackle with a first bearing end with an outer sleeve, a second bearing end and a shackle body which connects the first bearing end and the second bearing end, introducing an inner sleeve into the outer sleeve, and injecting a plastic between an outer wall of the inner sleeve and an inner wall of the outer sleeve, in order to produce a sleeve-shaped plastic plain bearing. As a result, the advantage is achieved that the fastening shackle can be realized in a manner which is particularly efficient in terms of production.

According to one example, the outer sleeve or the basic shackle is inserted into an injection moulding die before or after the introduction of the inner sleeve.

According to one example, the method comprises the release of an integrally joined connection between the inner wall of the outer sleeve and the sleeve-shaped plastic plain bearing, in order to mount the sleeve-shaped plastic plain bearing slidably in the outer sleeve. The release of the integrally joined connection can be brought about, for example, mechanically and/or with the aid of a separating agent, with which the inner wall of the outer sleeve is wetted, in order to prevent or to weaken the integrally joined connection. The release can be realized or assisted, furthermore, by way of axial shrinking of the plastic as a consequence of cooling.

The plastic can be, for example, one of the abovementioned plastics.

An equivalent effect is achieved if the inner sleeve is mounted rotatably in the plastic plain bearing, and the plastic plain bearing is connected fixedly to the outer sleeve, in particular to the inner wall of the outer sleeve.

According to a fourth aspect, the present disclosure therefore relates to a further fastening shackle for fastening a leaf spring to a vehicle body of a vehicle, having a first bearing end which can be fastened to the vehicle body, the first bearing end having an outer sleeve, an inner sleeve and a sleeve-shaped plastic plain bearing, and, in contrast to the fastening shackle according to the first and second aspect, the inner sleeve being mounted slidably in the sleeve-shaped plastic plain bearing, and the sleeve-shaped plastic plain bearing being connected fixedly to the outer sleeve.

The production of the further fastening shackle corresponds to the production of the fastening shackle, with the difference that the integrally joined connection between the inner sleeve and the plastic bearing is released after the injection of the plastic, it being possible for the inner sleeve to be wetted with a separating agent, in order to prevent or to weaken a connection to the injected plastic.

The further features of the further fastening shackle and its production correspond to the features of the fastening shackle.

BRIEF DESCRIPTION OF THE DRAWINGS

Further examples of the principles and techniques of this disclosure are will be explained in greater detail with reference to the appended drawings, in which.

DETAILED DESCRIPTION OF THE DRAWINGS

Figure 1A:
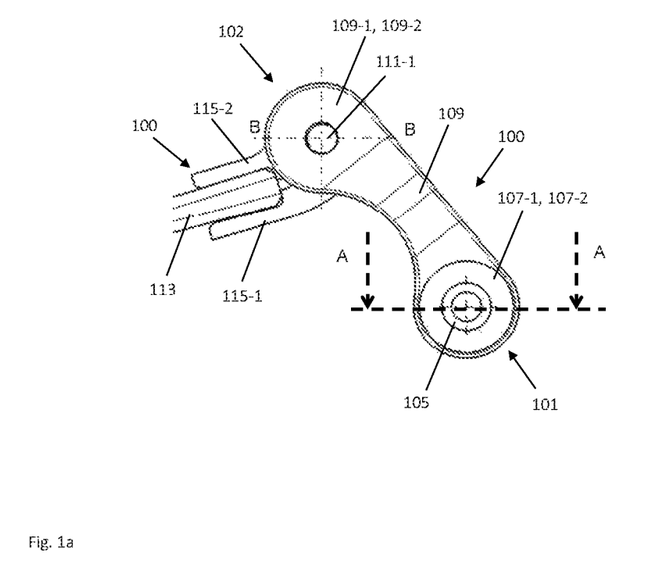
FIGS. 1a, 1b, and 1c show views of a fastening shackle.
Figure 1B:
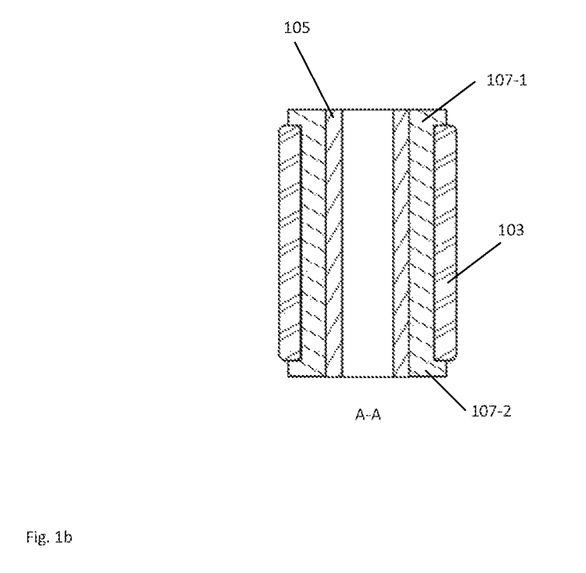
Figure 1C:
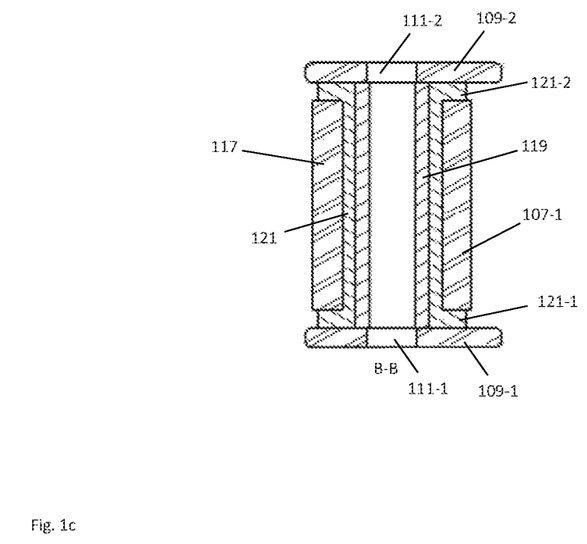

FIGS. 1a, 1b and 1c show views of a fastening shackle 100 according to the principles described herein.

FIG. 1a shows a side view of the fastening shackle 100. The fastening shackle 100 has a first bearing end 101 and a second bearing end 102. The first bearing end 101 can be fastened, for example, to a vehicle body of a vehicle (not shown in FIG. 1). Furthermore, the fastening shackle 100 comprises a shackle body 109 which connects the first bearing end 101 and the second bearing end 102.

FIG. 1b shows a section through the first bearing end 101. The first bearing end 101 comprises an outer sleeve 103, an inner sleeve 105 which is arranged in the outer sleeve 103, and a sleeve-shaped plastic plain bearing 107 which is arranged between the inner sleeve 105 and the outer sleeve 103. The outer sleeve 103 is shorter than the inner sleeve 105.

According to one optional embodiment, the sleeve-shaped plastic plain bearing 107 has, on the side, in each case one circumferential side collar 107-1, 107-2 which in each case forms a lateral stop and delimits the outer sleeve 103 laterally. The outer sleeve 103 can therefore be of shorter configuration than the inner sleeve 107.

According to one embodiment, the sleeve-shaped plastic plain bearing 107 is mounted slidably in the outer sleeve 103. In other words, an outer wall of the sleeve-shaped plastic plain bearing 107 slides on an inner wall of the outer sleeve 103. Here, the inner sleeve 105 is connected fixedly to the sleeve-shaped plastic plain bearing 107, for example in an integrally joined or positively locking manner. Therefore, the inner sleeve 105 rotates together with the sleeve-shaped plastic plain bearing 107 in the outer sleeve 103.

The outer sleeve 103 may be connected fixedly, for example in an integrally joined manner, to the shackle body 109.

The outer sleeve 103 and the shackle body 109 can, however, form a single-piece component.

The outer sleeve 103 and the shackle body 109 may be formed from the same material, in particular steel or aluminium or an aluminium alloy.

The shackle body 109 therefore extends from the outer sleeve 103 as far as the second bearing end 102.

The inner sleeve 105 can be produced from a rolled material blank, in particular a sheet metal blank or a steel blank. However, the inner sleeve 105 can be formed as a tube in a sleeve-like or tubular manner with a wall with a closed circumference.

The first bearing end 101 may be fastened to a vehicle body (not shown). To this end, the vehicle body can have side limbs with passages which can be penetrated by the bearing pin (not shown). The side limbs of the vehicle body can laterally receive or hold the inner sleeve 105. Here, the bearing pin penetrates the inner sleeve 105. Here, the side collars 107-1 and 107-2 bear flatly against the vehicle body.

The second bearing end 102 is provided to hold a leaf spring 113 which is shown by way of example. To this end, a leaf spring holder 115 is provided with two holding limbs 115-1, 115-2 which delimit a receiving space, into which a leaf spring end of the leaf spring 113 can be pushed. The leaf spring holder 115 can be an integral element of the second bearing end 115 or a separate component which can be secured by way of the bearing end 115.

FIG. 1c shows a section through the second bearing end 102.

The second bearing end 102 comprises an outer sleeve 117, an inner sleeve 119 which is arranged in the outer sleeve 117, and a plastic part 121 which is arranged between the inner sleeve 119 and the outer sleeve 117.

At the second bearing end 102, the shackle body 109 merges into two shackle webs 109-1 and 109-2 which laterally extend the shackle body 109. The shackle body 109 can fork, for example, into the shackle webs 109-1 and 109-2. Passages 111-1, 111-2 are formed in the shackle webs 109-1 and 109-2 and are provided for receiving a bearing pin.

The inner sleeve 119, the outer sleeve 117 and the plastic plain bearing 121 are arranged between the shackle webs 109-1 and 109-2 and are held by means of the bearing pin (not shown). The bearing pin penetrates the passages 111-1 and 111-2 and the inner sleeve 119.

According to one optional embodiment, the plastic part 121 has, on the side, in each case one circumferential side collar 121-1, 121-2 which in each case form a stop and delimit the outer sleeve 117 laterally.

According to one embodiment, the plastic part 121 is constructed from the same material as the sleeve-shaped plastic plain bearing 121, and likewise forms a sleeve-shaped plastic plain bearing.

According to one embodiment, the first bearing end 101 and the second bearing end 102 are of identical configuration.

According to one embodiment, the plastic part 121 is produced from an elastomer. In this case, the outer sleeve 117, the inner sleeve 119 and the plastic part 121 form an elastomeric bearing. According to one embodiment, the elastomeric bearing is an element of the second bearing end 102.

According to a further embodiment, the leaf spring holder 115 can have side webs which can be pushed into a space between the shackle webs 109-1 and 109-2. The side webs of the leaf spring holder 115 are clamped laterally, for example, by way of the shackle webs 109-1 and 109-2.

The elastomeric bearing can be formed in the leaf spring 113, however.

According to one embodiment, the sleeve-shaped plastic part 121 is mounted slidably in the outer sleeve 117. Therefore, an outer wall of the sleeve-shaped plastic plain bearing 121 slides on an inner wall of the outer sleeve 117. The inner sleeve 119 may be connected fixedly to the plastic part 121, for example in an integrally joined manner. Therefore, the inner sleeve 119 rotates together with the sleeve-shaped plastic plain bearing 121 in the outer sleeve 117. The inner sleeve 119 and the sleeve-shaped plastic part 121 may, however, not be connected to one another and may therefore be mounted such that they can be rotated with regard to one another.

In the exemplary embodiment which is shown in FIG. 1c, the shackle webs 109-1 and 109-2 are arranged by way of example laterally on the inner sleeve 119. The outer sleeve 117 can be shorter than the inner sleeve 119. The bearing pin can be provided, for example, for mounting the holder 115 of the leaf spring 113.

Figure 2A:
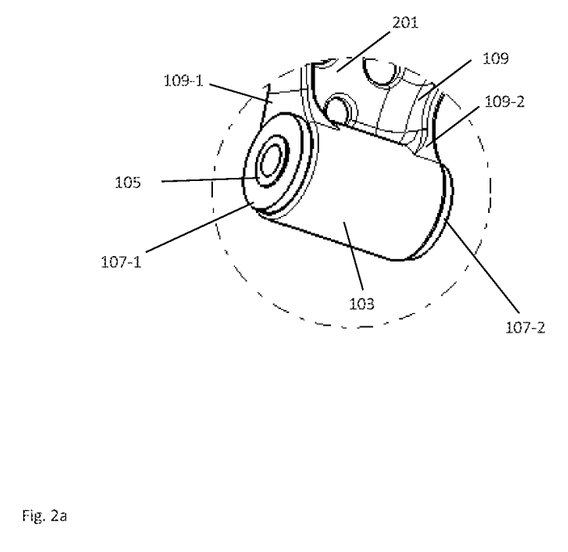
FIGS. 2a and 2b show views of a fastening shackle.
Figure 2B:
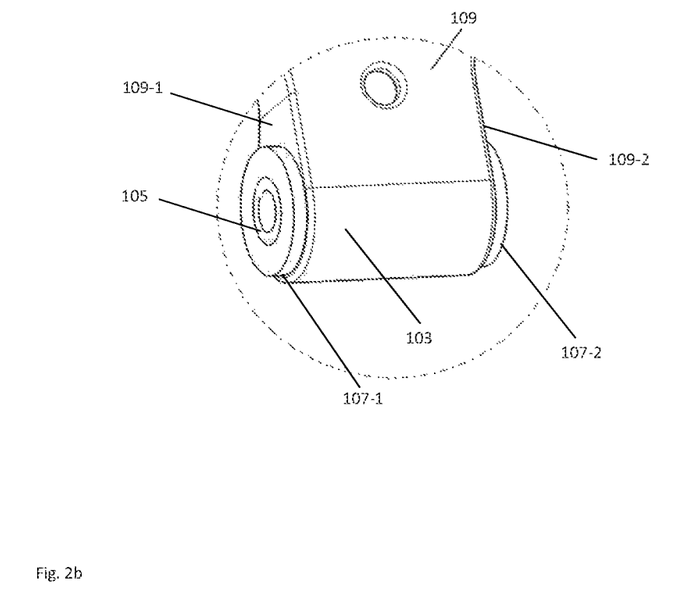

FIGS. 2a and 2b show views of the first bearing end 101. The shackle body comprises a rear wall 201 which connects the shackle webs 109-1 and 109-2 and can be connected to the latter in an integrally joined manner or can be formed in one piece with the latter. The shackle webs 109-1 and 109-2 merge with the rear wall 201 into the outer sleeve 103. The rear wall 201 is connected to the outer sleeve 103 or formed in one piece with it. The rear wall 201 serves to reinforce the fastening shackle 100.

The fastening shackle 100 can be produced in a manner which is particularly efficient in production terms, by the sleeve-shaped plastic plain bearing 107 being injected between the inner sleeve 105 and the outer sleeve 103, for example by means of a plastic injection moulding method.

In order to produce the fastening shackle 100, a production method can be carried out, comprising: providing a basic shackle with a first bearing end 101 with an outer sleeve 103, a second bearing end 102 and a shackle body 109 which connects the first bearing end 101 and the second bearing end 102, introducing an inner sleeve 105 into the outer sleeve 103, and injecting a plastic between an outer wall of the inner sleeve 105 and an inner wall of the outer sleeve 103, in order to produce a sleeve-shaped plastic plain bearing 107.

Figure 3:
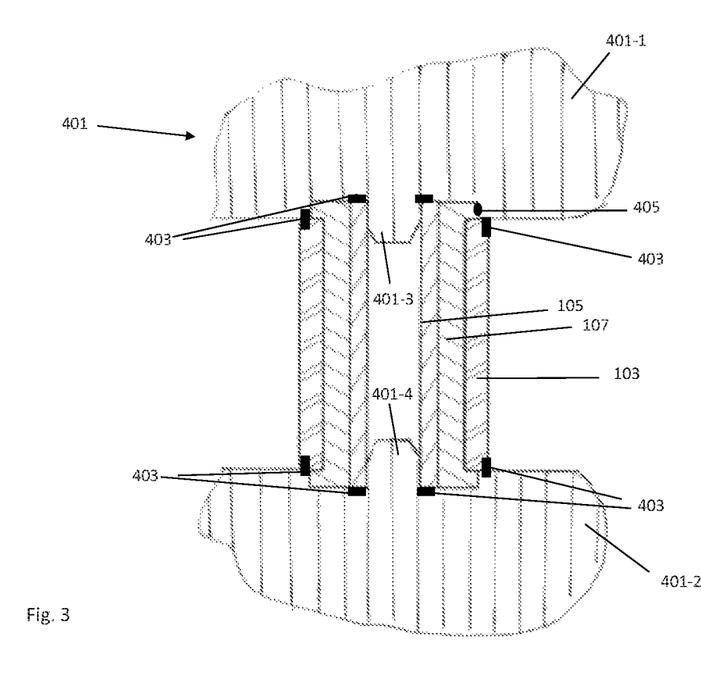
FIG. 3 shows the production of a fastening shackle.

The production method can be carried out, for example, by means of the plastic injection moulding die 401 which is shown diagrammatically in FIG. 3.

FIG. 3 shows an exemplary arrangement of the fastening shackle 100 as a basic shackle in the plastic injection moulding die 401 which can be used to produce the fastening shackle 100.

The plastic injection moulding die 401 comprises a plastic injection moulding die upper part 401-1 and a plastic injection moulding die lower part 401-2. The basic shackle is arranged between the plastic injection moulding die upper part 401-1 and the plastic injection moulding die lower part 401-2.

The plastic injection moulding die upper part 401-1 and the plastic injection moulding die lower part can have in each case one fixing aid 401-3 and 401-4 which are introduced at least partially into the inner sleeve 105. In this way, the inner sleeve 105 is positioned in the outer sleeve 103 in the installation position.

Furthermore, the plastic injection moulding die 401 comprises optional die seals 403 and an optional gate 405.

In one production step, plastic which forms the sleeve-shaped plastic plain bearing 107 after hardening can be injected between the inner sleeve 105 and the outer sleeve 103. The plastic can comprise, for example, a tribological polymer, to which reinforcing fibres, for example glass fibres, are added. In addition, the plastic material which is injected can have a solid lubricant. As a result, the stiffness of the resulting sleeve-shaped plastic plain bearing 107 is increased. The sleeve-shaped plastic plain bearing 107 may be less elastic than an elastomer which is used in an elastomeric bearing of a leaf spring.

A different plastic, for example a thermosetting plastic, can optionally be injected, the elasticity of which is lower than the elasticity of an elastomer.

The plastic may be to adhere fixedly only to the inner sleeve 105. To this end, the outer wall of the inner sleeve 105 can be provided with knurling, as a result of which the adhesion of the plastic sliding layer becomes more fixed on the inner sleeve 105 than on the outer sleeve 103. According to one embodiment, a separating agent can be used between the plastic and the inner wall of the outer sleeve 103.

After cooling, the plastic shrinks axially and/or radially, as a result of which the adhesion between the plastic and the outer sleeve 103 can be eliminated. The shrinkage of plastic after cooling can be taken into consideration by way of an injection moulding cavity.

The method which is shown in FIG. 3 can be used in an analogous manner to produce the second bearing end 102.

It is one advantage of the production method that the manufacturing tolerances are small, with the result that a freedom from contact can be ensured between the plastic sliding layer and the outer sleeve 103, as a result of which the noise, vibration, and harshness (NVH) requirements are also met.

What is claimed is:

1. A fastening shackle for fastening a leaf spring to a vehicle body of a vehicle, comprising:
    a first bearing end configured to fasten to the vehicle body, the first bearing end comprising an outer sleeve, an inner sleeve and a plastic plain bearing, wherein the outer sleeve is shorter than the inner sleeve, and wherein the plastic plain bearing being slidably mounted in the outer sleeve, and the inner sleeve being affixed to the plastic plain bearing, wherein the sleeve-shaped plastic plain bearing comprises, on each side, one circumferential side collar that forms a lateral stop and delimits the outer sleeve laterally;
    a second bearing end configured to fasten to the leaf spring; and
    a shackle body connecting the first bearing end and the second bearing end, wherein the second bearing end comprises a leaf spring holder configured to secure the leaf spring, wherein the leaf spring holder comprises two holding limbs which delimit a receiving space configured to receive a leaf spring end of the leaf spring, wherein an outer wall of the outer sleeve is integral with the shackle body, and wherein an outer wall of the plastic plain bearing is moveably coupled to an inner wall of the outer sleeve.

2. The fastening shackle according to claim 1, wherein the plastic plain bearing is a single-piece plastic sleeve.

3. The fastening shackle of claim 1, wherein the second bearing end is further configured to fasten to an elastomeric bearing configured to secure the leaf spring, and wherein a value of elasticity of the plastic plain bearing is lower than a value of elasticity of an elastomer of the elastomeric bearing.

4. The fastening shackle according to claim 1, wherein the plastic plain bearing is formed from a plastic comprising a tribological polymer.

5. The fastening shackle according to claim 1, wherein the plastic plain bearing is formed from a fibre composite material comprising a tribological polymer and reinforcing fibres.

6. The fastening shackle according to claim 1, wherein the plastic plain bearing is connected to an outer wall of the inner sleeve.

7. The fastening shackle according to claim 1, wherein the second bearing end comprises a bearing sleeve configured for penetration by a bearing pin.

8. The fastening shackle according to claim 1, wherein the shackle body comprises a first shackle web and a second shackle web at the second bearing end, and wherein each of the first shackle web and the second shackle web comprises a passage configured for penetration by a bearing pin.

9. The fastening shackle according to claim 1, wherein the first bearing end is rigid in a transverse direction of the leaf spring.

10. A leaf spring arrangement comprising:
    a leaf spring comprising an end; and
    a fastening shackle comprising:
    a first bearing end, the first bearing end comprising an outer sleeve, an inner sleeve and a plastic plain bearing, wherein the outer sleeve is shorter than the inner sleeve, and wherein the plastic plain bearing being slidably mounted in the outer sleeve, and the inner sleeve being affixed to the plastic plain bearing, wherein the sleeve-shaped plastic plain bearing comprises, on each side, one circumferential side collar that forms a lateral stop and delimits the outer sleeve laterally;
    a second bearing end; and
    a shackle body connecting the first bearing end and the second bearing end;
    wherein the end of the leaf spring is rotatably mounted at the second bearing end of the fastening shackle, and the first bearing end of the fastening shackle is fastened to a vehicle body, wherein the second bearing end comprises a leaf spring holder configured to secure the leaf spring, wherein the leaf spring holder comprises two holding limbs which delimit a receiving space configured to receive a leaf spring end of the leaf spring, wherein an outer wall of the outer sleeve is integral with the shackle body, and wherein an outer wall of the plastic plain bearing is moveably coupled to an inner wall of the outer sleeve.

11. The leaf spring arrangement according to claim 10, wherein the plastic plain bearing is a single-piece plastic sleeve.

12. The leaf spring arrangement according to claim 10, wherein the leaf spring is fastened to the second bearing end by means of an elastomeric bearing.

13. The leaf spring arrangement according to claim 10, wherein the plastic plain bearing is formed from a plastic comprising a tribological polymer.

14. The leaf spring arrangement according to claim 10, wherein the plastic plain bearing is connected to an outer wall of the inner sleeve.

15. A method for producing a fastening shackle for fastening a leaf spring to a vehicle body of a vehicle, comprising:
providing a basic shackle comprising a first bearing end with an outer sleeve, a second bearing end, and a shackle body connecting the first bearing end and the second bearing end, wherein the second bearing end comprises a leaf spring holder configured to secure the leaf spring, wherein the leaf spring holder comprises two holding limbs which delimit a receiving space configured to receive a leaf spring end;
introducing an inner sleeve into the outer sleeve, wherein the outer sleeve is shorter than the inner sleeve; and
injecting a plastic between an outer wall of the inner sleeve and an inner wall of the outer sleeve to produce a plastic plain bearing that is slidably mounted in the outer sleeve, wherein the sleeve-shaped plastic plain bearing comprises, on each side, one circumferential side collar that forms a lateral stop and delimits the outer sleeve laterally, wherein an outer wall of the outer sleeve is integral with the shackle body, and wherein an outer wall of the plastic plain bearing is moveably coupled to an inner wall of the outer sleeve.

16. The method according to claim 15, further comprising:
inserting the outer sleeve or the basic shackle into a plastic injection moulding die before or after the introduction of the inner sleeve.

17. The method according to claim 15, further comprising:
releasing an integrally joined connection between the inner wall of the outer sleeve and the plastic plain bearing to slidably mount the plastic plain bearing in the outer sleeve.

* * * * *